United States Patent
Bullard

(10) Patent No.: US 8,556,533 B2
(45) Date of Patent: Oct. 15, 2013

(54) MULTI-STAGE FLEXURAL PIVOT

(75) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/301,593

(22) Filed: Nov. 21, 2011

(65) Prior Publication Data

US 2013/0129407 A1 May 23, 2013

(51) Int. Cl.
  *F16F 1/18* (2006.01)
(52) U.S. Cl.
  USPC .......................................... 403/291; 267/160
(58) Field of Classification Search
  USPC ........... 403/113, 117, 220, 221, 291; 267/160
  See application file for complete search history.

(56) References Cited

U.S. PATENT DOCUMENTS

| | | | |
|---|---|---|---|
| 3,181,918 A | | 5/1965 | Troeger |
| 3,319,951 A | * | 5/1967 | Seelig ............................ 267/160 |
| 3,494,672 A | * | 2/1970 | Towner .......................... 403/291 |
| 3,544,175 A | * | 12/1970 | Tooker ........................... 403/291 |
| 3,813,089 A | | 5/1974 | Troeger |
| 4,802,720 A | * | 2/1989 | Paulsen ....................... 359/226.2 |
| 4,802,784 A | | 2/1989 | Brooks |
| 4,997,123 A | * | 3/1991 | Backus et al. ................ 228/182 |
| 5,150,827 A | * | 9/1992 | Fries ............................ 228/44.7 |
| 5,265,853 A | * | 11/1993 | Szirtes .......................... 267/160 |
| 5,335,418 A | * | 8/1994 | Krivec ............................ 30/266 |
| 5,543,812 A | | 8/1996 | Blanche, IV et al. |
| 5,620,169 A | * | 4/1997 | Payne ........................... 267/160 |
| 6,124,687 A | | 9/2000 | Sasso et al. |
| 6,146,044 A | | 11/2000 | Clavet |
| 6,666,612 B2 | * | 12/2003 | Lorigny et al. ............... 403/291 |
| 7,857,833 B2 | * | 12/2010 | Abdou .......................... 606/254 |
| 2002/0024771 A1 | * | 2/2002 | He et al. ..................... 360/265.7 |

OTHER PUBLICATIONS

Bearing Product Brochure; C-Flex Bearing Co., Inc.; http://www.c-flex.com/companyproducts.pdf; 2010; 5 pages.

* cited by examiner

*Primary Examiner* — Joshua Kennedy
(74) *Attorney, Agent, or Firm* — Thorpe North & Western LLP

(57) ABSTRACT

A multi-stage flexural pivot includes a first support member, a second support member, a coupler, and a plurality of flexures, each flexure having first and second flexible members arranged substantially perpendicular to one another and laterally offset from one another. A first flexure of the plurality of flexures is coupled between the first support member and the coupler to form a first stage and provide for relative rotational movement between the first support member and the coupler. A second flexure of the plurality of flexures is coupled between the second support member and the coupler to form a second stage and provide for relative rotational movement between the second support member and the coupler. Relative rotational movement between the first support member and the second support member is a sum of the relative rotational movements of the first stage and the second stage.

17 Claims, 4 Drawing Sheets

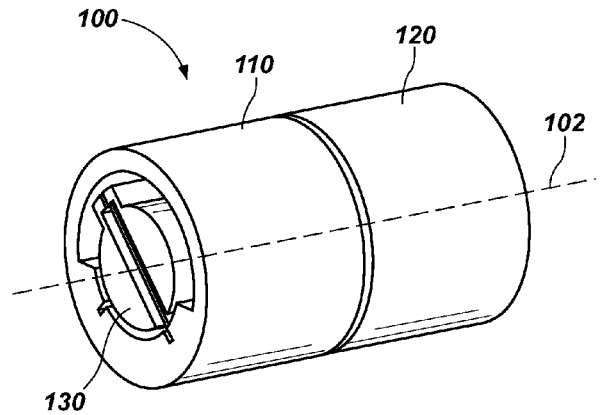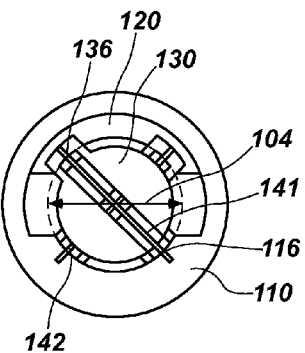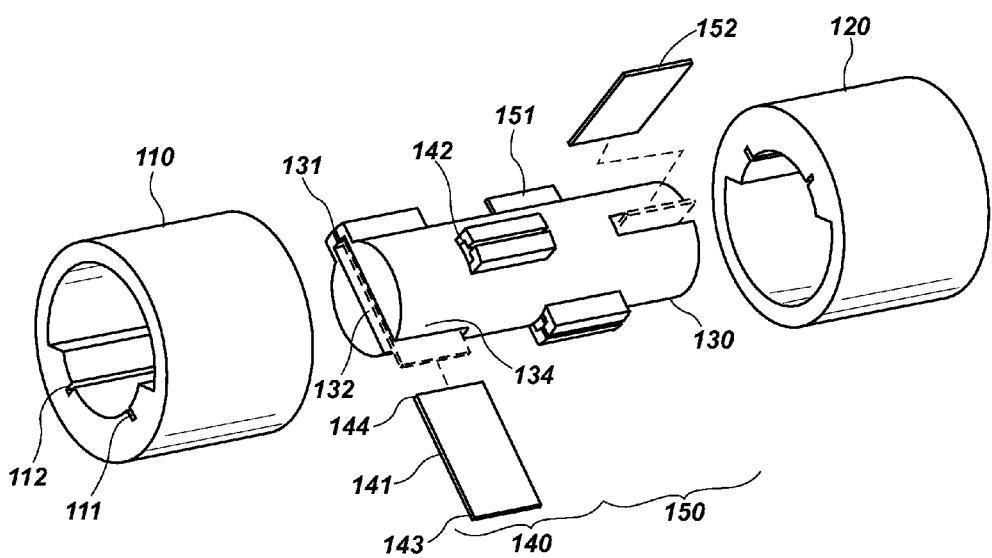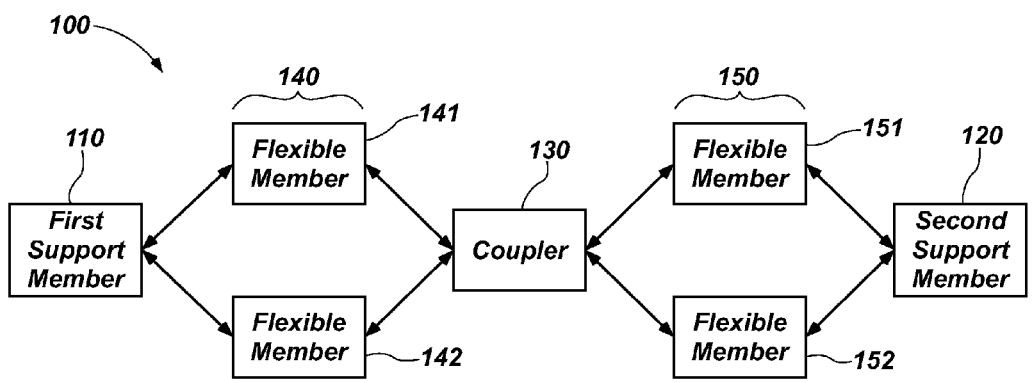

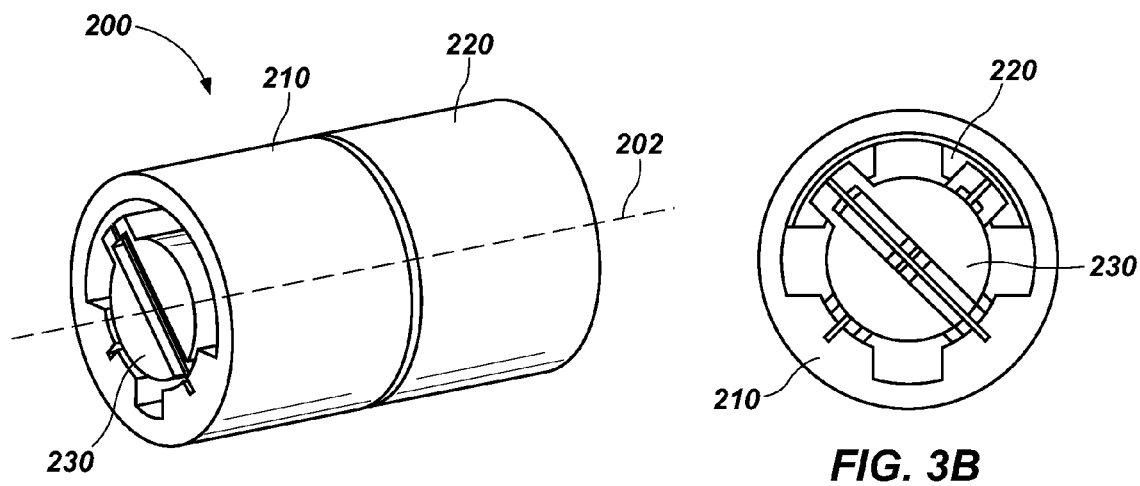
FIG. 3A
FIG. 3B
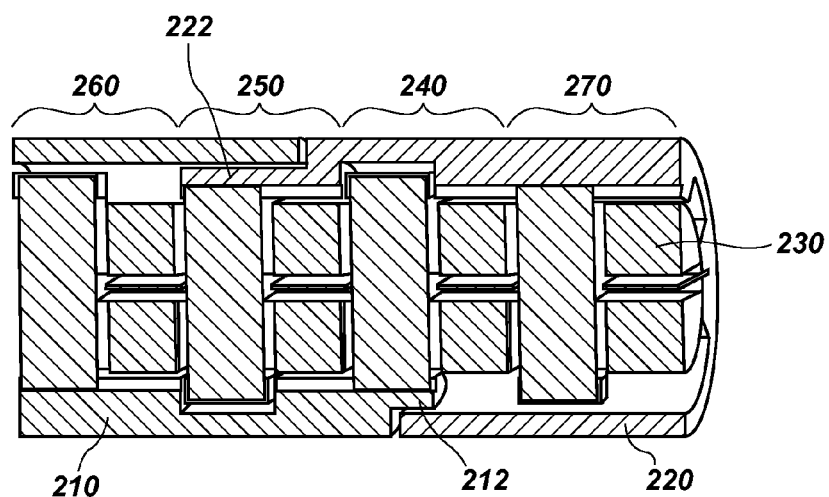
FIG. 3C
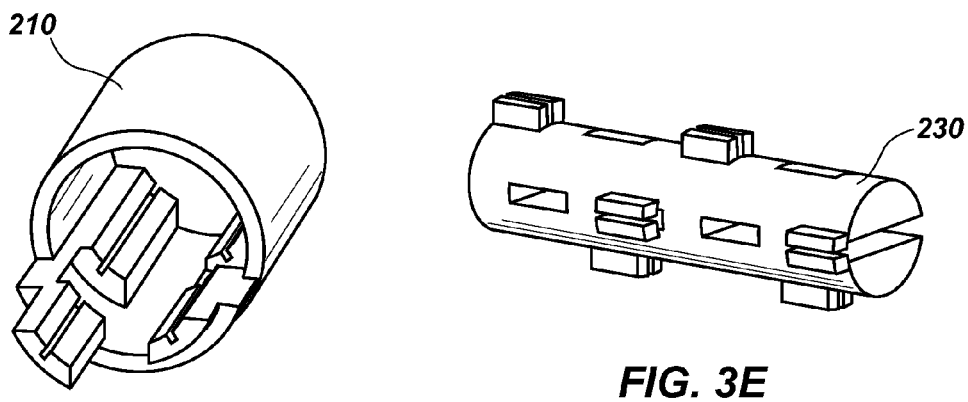
FIG. 3D
FIG. 3E

MULTI-STAGE FLEXURAL PIVOT

BACKGROUND

Flexural pivots are devices that permit mechanical members to pivot about a common axis relative to each other through a limited angle range. Because angular motion is accomplished through flexing of elastic flexural elements, rather than contact surface displacement, flexural pivots operate without friction and thus without a need for lubrication. Flexural pivots can therefore be a substitute for bearings in applications where friction and/or the need for lubrication are concerns.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1A is an example illustration of a multi-stage flexural pivot in accordance with an embodiment of the present invention.

FIG. 1B is an end view of the multi-stage flexural pivot of FIG. 1A.

FIG. 1C is an exploded view of the multi-stage flexural pivot of FIG. 1A.

FIG. 2 is load path diagram of the multi-stage flexural pivot of FIG. 1A.

FIG. 3A is an example illustration of a multi-stage flexural pivot in accordance with another embodiment of the present invention.

FIG. 3B is an end view of the multi-stage flexural pivot of FIG. 3A.

FIG. 3C is a section view of the multi-stage flexural pivot of FIG. 3A.

FIG. 3D is an example illustration of a support member of the multi-stage flexural pivot of FIG. 3A.

FIG. 3E is an example illustration of a coupler of the multi-stage flexural pivot of FIG. 3A.

Figure 4A:
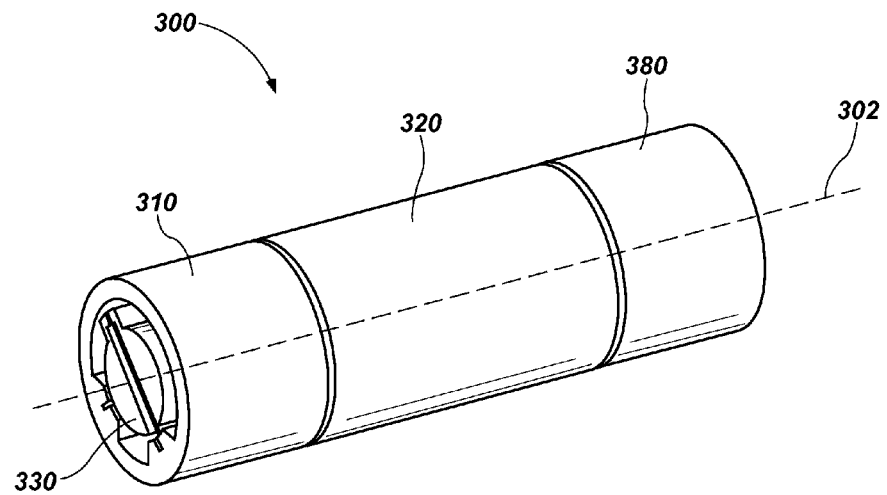
FIG. 4A is an example illustration of a multi-stage flexural pivot in accordance with yet another embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although flexural pivots have many advantages, the limited range of angular motion available with flexural pivots, however, can preclude using flexural pivots in some applications. Additionally, the axis of rotation of flexural pivots can shift when moved through the range of angular motion, which can be detrimental in precision applications. Moreover, bending stiffness of flexural pivots can be a concern due to the inherent flexibility of the elastic flexural elements. Thus, potential applications for flexural pivots can increase by increasing the range of angular motion, minimizing the shift of the axis of rotation, and increasing bending stiffness.

Accordingly, a multi-stage flexural pivot is disclosed that increases the range of angular motion over typical flexural pivots and minimizes the shift of the axis of rotation as the flexural pivot operates. In one aspect, bending stiffness is increased over typical flexural pivots. The flexural pivot includes a first support member, a second support member, a coupler, and a plurality of flexures, each flexure having first and second flexible members arranged substantially perpendicular to one another and laterally offset from one another. A first flexure of the plurality of flexures is coupled between the first support member and the coupler to form a first stage and provide for relative rotational movement between the first support member and the coupler. A second flexure of the plurality of flexures is coupled between the second support member and the coupler to form a second stage and provide for relative rotational movement between the second support member and the coupler. Relative rotational movement between the first support member and the second support member is a sum of the relative rotational movements of the first stage and the second stage.

One embodiment of a multi-stage flexural pivot 100 is illustrated in FIGS. 1A-1C. The multi-stage flexural pivot 100 can comprise a first support member 110, a second support member 120, a coupler 130, and a plurality of flexures 140, 150. The second support member 120 can be rotatable, such as about an axis 102, relative to the first support member 110. The coupler 130 can be rotatable, such as about the axis 102, relative to the first support member 110 and the second support member 120. The first support member 110 and the second support member 120 can be rotatably coupled to one another via the coupler 130 and the flexures 140, 150.

Each flexure can have first and second flexible members arranged substantially perpendicular to one another and offset from one another, such as along the axis 102. For example, flexure 140 includes a pair of flexible members 141, 142 and flexure 150 includes a pair of flexible members 151, 152. It should be understood, however, that a flexure can include two or more flexible members, with at least one of the flexible members being substantially perpendicular to at least one other flexible member within the flexure.

Flexure 140 can be coupled between the first support member 110 and the coupler 130 to form a first stage of rotation and to provide for relative rotational movement between the first support member 110 and the coupler 130 about the axis 102. Flexure 150 can be coupled between the second support member 120 and the coupler 130 to form a second stage of rotation and provide for relative rotational movement between the second support member 120 and the coupler 130 about the axis 102. Relative rotational movement between the first support member 110 and the second support member 120 about the axis 102 is a sum of the relative rotational movements of the first stage and the second stage. Thus, by utilizing the coupler 130 in the configuration described above with the first support member 110 and the second support member 120, the maximum possible angle of rotation can be increased by a factor of two over a single stage of rotation.

Each of the flexible members can have a support end and a coupler end for coupling between the support members and the coupler. For example, flexible member 140 can have a support end 143 and a coupler end 144. The support ends of the flexible members can couple to the support members 110, 120. As shown in FIG. 1C, the support end 143 of flexible member 140 is coupled to the first support member 110, in this case, at an inner surface 111 configured as a slot. The support end of a flexible member can be attached to a support member with a braze, weld, adhesive, crimp, fastener, interference fit, or any other suitable form of attachment for a flexible member and a support member.

Additionally, the coupler ends of the flexible members can be coupled to the coupler 130. For example, the coupler end 144 of flexible member 141 is coupled to the coupler 130 at coupling location 131. The coupler 130 can comprise a radial opening 132 extending from an outer surface 134 of the coupler 130 (e.g., through a center of the coupler) to receive the coupler end 144 of flexible member 141 disposed within the radial opening 132. A coupler end of a flexible member can be attached to the coupler with a braze, weld, adhesive, crimp, fastener, interference fit, or any other suitable form of attachment for a flexible member and a coupler.

In one aspect, the flexible members can comprise a blade configuration. The support members and the coupler can be configured to interface with the support end and the coupler end of the blade, respectively, to facilitate attachment with the blade.

As shown in FIG. 1B, the support members and the coupler can be configured to couple with a flexible member such that the support member coupling location 116 and the coupler coupling location 136 define a circle 104 substantially centered about the axis 102. By providing a substantially uniform spacing between the coupling locations 116, 136 of the support member and the coupler about the axis 102, the shift of the axis of rotation during operation can be reduced. Additionally, the two stage configuration of the multi-stage flexural pivot 100 can further reduce the shift of the axis of rotation. During use, each stage produces some amount of shift of the axis of rotation. The stages are configured such that the shift due to operation of one stage is offset at least to some degree by the shift due to operation of the other stage. Thus, the total net shift of the axis of rotation can be minimized with the multi-stage flexural pivot 100.

In one aspect, an outer surface of the coupler 130 can be at least partially cylindrical about the axis 102. A cylindrical configuration can facilitate rotational movement of the coupler 130 about the axis 102, particularly if the coupler 130 is disposed at least partially within the first support member 110 and/or the second support member 120. Locating the coupler in the center of the pivot flexure can result in a low rotating inertia, which can provide high bandwidth capabilities for applications such as servo-control mechanisms.

In another aspect, an outer surface of the first support member 110 and/or the second support member 120 can be substantially cylindrical about the axis 102. A cylindrical outer surface configuration can facilitate coupling a support member with a base support. For example, a base support may be configured to interface with a cartridge bearing having a cylindrical exterior surface. In this case, the cartridge bearing can be replaced with a multi-stage flexural pivot having a cylindrical outer surface. However, it should be recognized that an outer surface of a support member can be of any suitable geometric configuration for interfacing with a base support and, in one aspect, can be integrated with a base support.

Shown in FIG. 2 is a schematic illustration of a load path of the multi-stage flexural pivot 100. As shown, from the first support member 110 the load path splits into parallel paths to the flexible members 141, 142 of the flexure 140. The load path then converges from the flexible members 141, 142 to the coupler 130. From the coupler 130, the load path splits into parallel paths to the flexible members 151, 152 of the flexure 150. The load path then converges from the flexible members 151, 152 to the second support member 120. As shown in the figure, the parallel load paths through the flexible members of both flexures 140, 150 converge at the coupler 130, such that the coupler 130 reacts to all loads through the multi-stage flexural pivot 100. This coupler configuration provides stiffness for the multi-stage flexural pivot 100 as it ties the flexures 140, 150 together.

An embodiment of a multi-stage flexural pivot 200 is illustrated in FIGS. 3A-3E. In this embodiment, enhanced stiffness over the multi-stage flexural pivot 100 shown in FIGS. 1A-1C can be achieved. Relative to the multi-stage flexural pivot 100 discussed above, the multi-stage flexural pivot 200 can further comprise a third flexure coupled between the first support member 210 and the coupler 230 to improve off-axis bending stiffness of the first stage. Additionally, a fourth flexure can be coupled between the second support member 220 and the coupler 230 to improve off-axis bending stiffness of the second stage.

For example, flexure 240 can be coupled between the first support member 210 and the coupler 230 and flexure 250 can be coupled between the second support member 220 and the coupler 230. A coupling having two flexures between a support member and the coupler can improve bending stiffness over a coupling having only a single flexure between a support member and the coupler. Flexure 260 can therefore be coupled between the first support member 210 and the coupler 230 to improve bending stiffness of the first stage. Likewise, flexure 270 can be coupled between the second support member 220 and the coupler 230 to improve bending stiffness of the second stage.

In one aspect, the flexure 250 can be disposed between flexure 240 and flexure 260 along the axis 202 to intersperse or intermingle components of the first stage and the second stage and increase off-axis bending stiffness of the flexural pivot 200. Likewise, flexure 240 can be disposed between flexure 250 and flexure 270 along the axis to intersperse or intermingle components of the first stage and the second stage and increase off-axis bending stiffness of the flexural pivot 200. To accommodate intermingling flexures of the first stage and the second stage, flexures of a single stage (such as flexures 240, 260) can be spaced apart from one another to make room for a flexure of another stage (such as flexure 250). This additional spacing to accommodate an intermingled flexure can improve stiffness over a lesser spacing between flexures of a given stage. Furthermore, intermingling of stages can reduce the overall length of the multi-stage flexural pivot 200, which can also have a positive effect on stiffness. Thus, incorporating an additional flexure in a given stage and intermingling flexures of different stages can improve or enhance the stiffness characteristics of a flexural pivot.

In another aspect, the second support member 220 can be disposed at least partially within (i.e., overlap) the first support member 210 and/or the first support member 210 can be disposed at least partially within the second support member 220. This configuration can be implemented when intermingling flexures of different stages. For example, in order to dispose the first flexure 240 between the second flexure 250 and the fourth flexure 270, at least a portion 212 of the first support member 210 can be disposed within the second support member 220 to provide a coupling location for the flexure 240. Similarly, in order to dispose the second flexure 250 between the first flexure 240 and the third flexure 260, at least a portion 222 of the second support member 220 can be disposed within the first support member 210 to provide a coupling location for the flexure 250. The first support member 210 is shown in FIG. 3D. The second support member 220 can be configured to be substantially the same as, or identical to, the first support member 210. The coupler 230 is shown in FIG. 3E and illustrates a configuration to accommodate eight flexible members of the four flexures 240, 250, 260, 270 of the multi-stage flexural pivot 200.

Figure 4B:
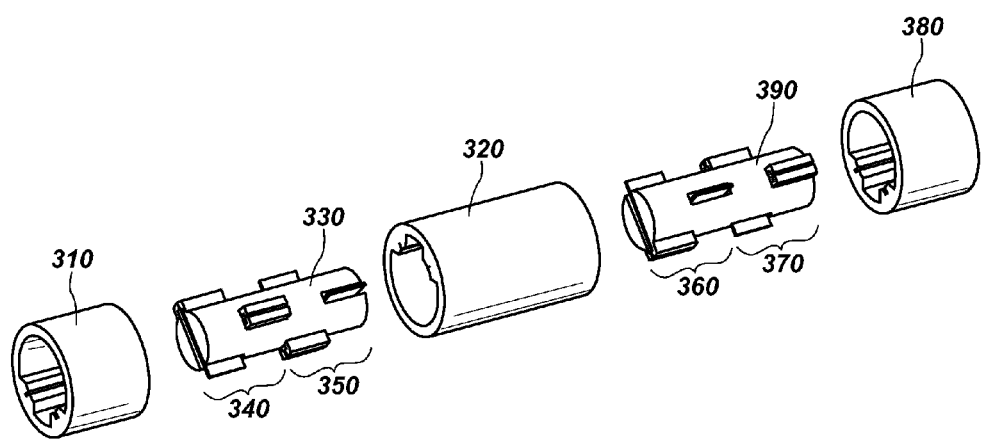
FIG. 4B is an exploded view of the multi-stage flexural pivot of FIG. 4A.

An embodiment of a multi-stage flexural pivot 300 is illustrated in FIGS. 4A-4B. In this embodiment, an additional coupler and support member can provide increased rotational movement range over the multi-stage flexural pivot 100 shown in FIGS. 1A-1C. Relative to the multi-stage flexural pivot 100 discussed above, the multi-stage flexural pivot 300 can further comprise a coupler 390 rotatable about an axis 302 relative to a first support member 310, a second support member 320, and a coupler 330. Additionally, the multi-stage flexural pivot 300 can comprise a third support member 380 rotatable about the axis 302 relative to the first support member 310, the second support member 320, the coupler 330, and the coupler 390. The third support member 380 can be rotatably coupled to the second support member 320 via coupler 390 and flexures 360, 370. The additional coupler 390 and the third support member 380 provide two additional stages of rotation, which doubles the number of stages. This can increase the rotational movement range over the multi-stage flexural pivot 100, discussed above, by a factor of two.

For example, flexure 340 can be coupled between the first support member 310 and the coupler 330 to form a first stage and flexure 350 can be coupled between the second support member 320 and the coupler 330 to form a second stage. Additionally, flexure 360 can be coupled between the second support member 320 and the coupler 390 to form a third stage and provide for relative rotational movement between the second support member 320 and the coupler 390 about the axis 302. Furthermore, flexure 370 can be coupled between the third support member 380 and the coupler 390 to form a fourth stage and provide for relative rotational movement between the third support member 380 and the coupler 390 about the axis 302. Relative rotational movement between the first support member 310 and the third support member 380 about the axis 302 is a sum of the relative rotational movements of the first stage, the second stage, the third stage, and the fourth stage.

Figure 5A:
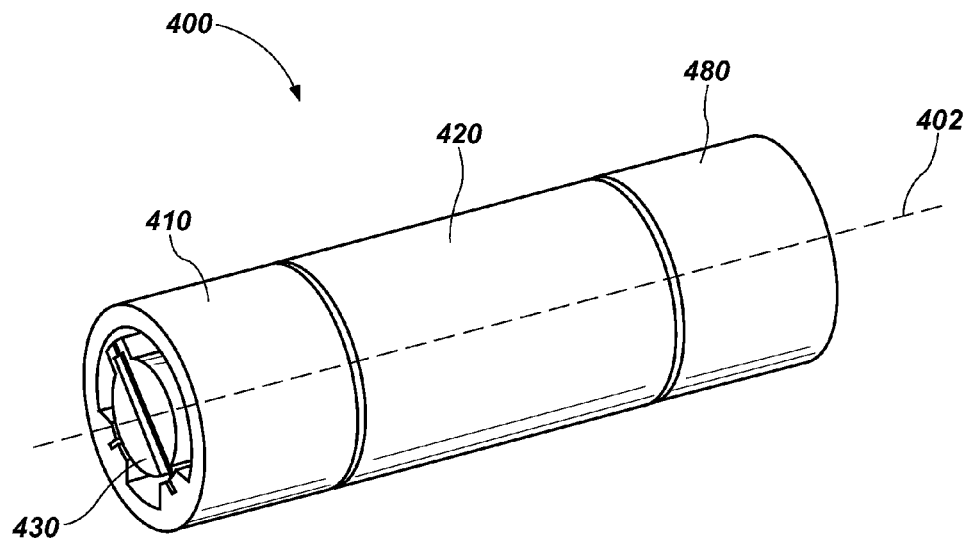
FIG. 5A is an example illustration of a multi-stage flexural pivot in accordance with still another embodiment of the present invention.
Figure 5B:
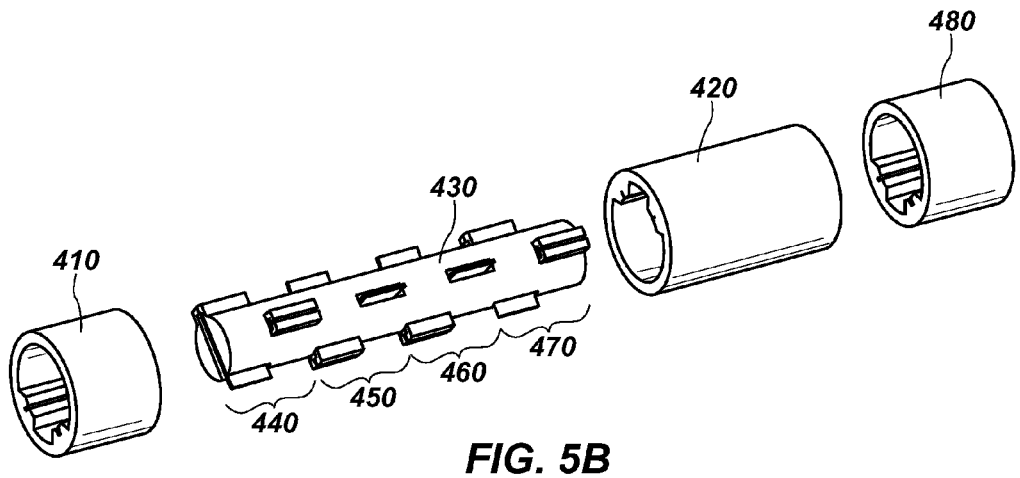
FIG. 5B is an exploded view of the multi-stage flexural pivot of FIG. 5A.

An embodiment of a multi-stage flexural pivot 400 is illustrated in FIGS. 5A-5B. In this embodiment, an additional support member, relative to the multi-stage flexural pivot 100 shown in FIGS. 1A-1C, can provide a double-ended multi-stage flexural pivot 400. The multi-stage flexural pivot 400 can further comprise a third support member 480 rotatable about an axis 402 relative to a second support member 420 and a coupler 430. The first support member 410 and the third support member 480 are coupleable to one another to provide for substantially the same rotational movement relative to the second support member 420.

For example, flexure 440 can be coupled between the first support member 410 and the coupler 430 to form a first stage and flexures 450, 460 can be coupled between the second support member 420 and the coupler 430 to form a second stage. A flexure 470 can be coupled between the third support member 480 and the coupler 430 to provide for relative rotational movement between the third support member 480 and the coupler 430 about the axis 402. With this configuration, the first support member 410 and the third support member 480 can be constrained to move with one another, or in other words, constrained such that there is no relative rotational movement between them. In this case, the multi-stage flexural pivot 400 can function as a double-ended flexural pivot. The second support member 420 can be configured to support or couple with an object that is desired to be rotatable relative to both ends of the flexural pivot 400, which may be fixed in a base support. The second stage optionally includes two flexures 450, 460, that can provide increased bending stiffness over a single flexure per stage.

Figure 6:
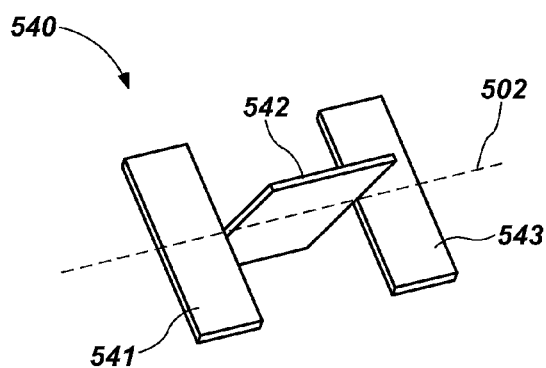
FIG. 6 is an example illustration of a flexure of a multi-stage flexural pivot in accordance with an embodiment of the present invention.

An embodiment of a flexure 540 that can be used in a multi-stage flexural pivot is illustrated in FIG. 6. As discussed hereinabove with reference to FIGS. 1A-5B, the example flexures illustrated include two flexible members per flexure. In accordance with the present disclosure, however, a flexure can include two or more flexible members. For example, a flexure 540 having three flexible members 541, 542, 543 is shown in FIG. 6. Flexible member 541 is arranged substantially perpendicular to, and laterally offset from, flexible member 542. As shown, the flexible members can be offset along axis 502. Flexible member 543 is arranged substantially parallel to, and laterally offset from, flexible member 541. In one aspect, flexible member 542 can be disposed between flexible members 541, 543. The spacing provided between flexible members 541, 543 in this arrangement can improve stiffness in one dimension. Flexible member 542 is wider than flexible members 541, 543 and thus provides improved stiffness in another dimension. Three flexible members thus configured and arranged can be utilized to improve bending stiffness of a coupling between a support member and a coupler.

In accordance with one embodiment of the present invention, a method for configuring a multi-stage flexural pivot is disclosed. The method can comprise obtaining a first support member, a second support member, a coupler rotatable about an axis relative to the first support member and the second support member, and a plurality of flexures, each flexure having first and second flexible members arranged substantially perpendicular to one another and laterally offset from one another, and each of the first and second flexible members having a support end and a coupler end. The method further comprises disposing a first flexure of the plurality of flexures between the first support member and the coupler to form a first stage and to provide for relative rotational movement between the first support member and the coupler about the axis. Additionally, the method can comprise disposing a second flexure of the plurality of flexures between the second support member and the coupler to form a second stage and provide for relative rotational movement between the second support member and the coupler about the axis, wherein relative rotational movement between the first support member and the second support member about the axis is a sum of the relative rotational movements of the first stage and the second stage.

In accordance with another embodiment of the present invention, a method for facilitating rotation of an object is disclosed. The method can comprise configuring a multi-stage flexural pivot to comprise a first support member, a second support member rotatable about an axis relative to the first support member, a coupler rotatable about the axis relative to the first support member and the second support member, and a plurality of flexures, each flexure having first and second flexible members arranged substantially perpendicular to one another and offset from one another along the axis, and each of the first and second flexible members having a support end and a coupler end. A first flexure of the plurality of flexures is coupled between the first support member and the coupler to form a first stage and to provide for relative rotational movement between the first support member and the coupler about the axis. A second flexure of the plurality of flexures is coupled between the second support member and the coupler to form a second stage and provide for relative rotational movement between the second support member and the coupler about the axis. Relative rotational movement between the first support member and the second support member about the axis is a sum of the relative rotational movements of the first stage and the second stage. Additionally, the method can comprise facilitating coupling of the multi-stage flexural pivot to an object to provide angular rotation of the object.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A multi-stage flexural pivot, comprising:
a first support member;
a second support member rotatable about an axis relative to the first support member;
a coupler rotatable about the axis relative to the first support member and the second support member; and
a plurality of flexures, each flexure having first and second flexible members arranged substantially perpendicular to one another and offset from one another along the axis,
wherein a first flexure of the plurality of flexures is coupled between the first support member and the coupler to form a first stage and to provide for relative rotational movement between the first support member and the coupler about the axis,
wherein a second flexure of the plurality of flexures is coupled between the second support member and the coupler to form a second stage and provide for relative rotational movement between the second support member and the coupler about the axis,
wherein the first stage further comprises a third flexure of the plurality of flexures coupled between the first support member and the coupler, and the second stage further comprises a fourth flexure of the plurality of flexures coupled between the second support member and the coupler,
wherein the second flexure is disposed between the first flexure and the third flexure along the axis to intersperse components of the first stage and the second stage and increase off-axis bending stiffness of the flexural pivot, and
wherein relative rotational movement between the first support member and the second support member about the axis is a sum of the relative rotational movements of the first stage and the second stage.

2. The multi-stage flexural pivot of claim 1, wherein each of the first and second flexible members have a support end and a coupler end, the support ends of the flexible members of the first flexure being coupled to the first support member, the support ends of the flexible members of the second flexure being coupled to the second support member, and the coupler ends of each of the flexible members being coupled to the coupler.

3. The multi-stage flexural pivot of claim 1, wherein an outer surface of the coupler is at least partially cylindrical about the axis.

4. The multi-stage flexural pivot of claim 1, wherein an outer surface of at least one of the first support member and the second support member is substantially cylindrical about the axis.

5. The multi-stage flexural pivot of claim 4, wherein the coupler is disposed at least partially within at least one of the first support member and the second support member.

6. The multi-stage flexural pivot of claim 1, wherein the second support member is disposed at least partially within the first support member.

7. The multi-stage flexural pivot of claim 6, wherein the first support member is disposed at least partially within the second support member.

8. The multi-stage flexural pivot of claim 1, wherein the coupler comprises a radial opening extending from an outer surface of the coupler through a center of the coupler to receive a coupler end of a flexible member disposed within the radial opening.

9. The multi-stage flexural pivot of claim 1, wherein the flexible members comprise a blade configuration.

10. The multi-stage flexural pivot of claim 1, wherein the first flexure further comprises a third flexible member arranged substantially parallel to one of the first or second flexible members of the first flexure and offset from the first and second flexible members along the axis.

11. The multi-stage flexural pivot of claim 1, further comprising:
a second coupler rotatable about the axis relative to the first support member, the second support member, and the first coupler; and
a third support member rotatable about the axis relative to the first support member, the second support member, the first coupler, and the second coupler,
wherein a fifth flexure of the plurality of flexures is coupled between the second support member and the second coupler to form a third stage and provide for relative rotational movement between the second support member and the second coupler about the axis,
wherein a sixth flexure of the plurality of flexures is coupled between the third support member and the second coupler to form a fourth stage and provide for relative rotational movement between the third support member and the second coupler about the axis, and
wherein relative rotational movement between the first support member and the third support member about the axis is a sum of the relative rotational movements of the first stage, the second stage, the third stage, and the fourth stage.

12. The multi-stage flexural pivot of claim 1, further comprising:
a third support member rotatable about the axis relative to the second support member and the coupler,
wherein a fifth flexure of the plurality of flexures is coupled between the third support member and the coupler to provide for relative rotational movement between the third support member and the coupler about the axis, and
wherein the first support member and the third support member are coupleable to one another to provide for substantially the same rotational movement relative to the second support member.

13. A multi-stage flexural pivot, comprising:
a first support member and a second support member rotatably coupled to one another via a coupler and a plurality of flexures, each flexure having a pair of flexible members arranged substantially perpendicular to one another and laterally offset from one another, and each of the flexible members having a support end and a coupler end,
wherein a first flexure of the plurality of flexures is coupled between the first support member and the coupler to form a first stage and provide for relative rotational movement between the first support member and the coupler,
wherein a second flexure of the plurality of flexures is coupled between the second support member and the coupler to form a second stage and provide for relative rotational movement between the first support member and the coupler,
wherein a third flexure of the plurality of flexures is coupled between the first support member and the coupler, and a fourth flexure of the plurality of flexures is coupled between the second support member and the coupler,
wherein the second flexure is disposed between the first flexure and the third flexure to intermingle components of the first stage and the second stage and increase bending stiffness of the flexural pivot, and
wherein relative rotational movement between the first support member and the second support member about the axis is a sum of the relative rotational movements of the first stage and the second stage.

14. The multi-stage flexural pivot of claim 13, further comprising:
a third support member rotatably coupled to the second support member via a second coupler and the plurality of flexures,
wherein a fifth flexure of the plurality of flexures is coupled between the second support member and the second coupler to form a third stage and provide for relative rotational movement between the second support member,
wherein the second coupler and a sixth flexure of the plurality of flexures is coupled between the third support member and the second coupler to form a fourth stage and provide for relative rotational movement between the third support member and the second coupler,
wherein relative rotational movement between the first support member and the third support member is a sum of the relative rotational movements of the first stage, the second stage, the third stage, and the fourth stage.

15. The multi-stage flexural pivot of claim 13, further comprising:
a third support member rotatable relative to the second support member and the coupler,
wherein a fifth flexure of the plurality of flexures is coupled between the third support member and the coupler to provide for relative rotational movement between the third support member and the coupler, and
wherein the first support member and the third support member are coupleable to one another to provide for substantially the same rotational movement relative to the second support member.

16. A method for configuring a multi-stage flexural pivot, comprising:
obtaining a first support member, a second support member, a coupler rotatable about an axis relative to the first support member and the second support member, and a plurality of flexures, each flexure having first and second flexible members arranged substantially perpendicular to one another and laterally offset from one another, and each of the first and second flexible members having a support end and a coupler end;
disposing a first flexure of the plurality of flexures between the first support member and the coupler to form a first stage and to provide for relative rotational movement between the first support member and the coupler about the axis; and
disposing a second flexure of the plurality of flexures between the second support member and the coupler to form a second stage and provide for relative rotational movement between the second support member and the coupler about the axis, wherein the first stage further comprises a third flexure of the plurality of flexures coupled between the first support member and the coupler, and the second stage further comprises a fourth flexure of the plurality of flexures coupled between the second support member and the coupler, wherein the second flexure is disposed between the first flexure and the third flexure along the axis to intersperse components of the first stage and the second stage and increase off-axis bending stiffness of the flexural pivot, and wherein relative rotational movement between the first support member and the second support member about the axis is a sum of the relative rotational movements of the first stage and the second stage.

17. A multi-stage flexural pivot, comprising:

a first support member;

a second support member rotatable about an axis relative to the first support member;

a coupler rotatable about the axis relative to the first support member and the second support member; and a plurality of flexures, each flexure having first and second flexible members arranged substantially perpendicular to one another and offset from one another along the axis, wherein a first flexure of the plurality of flexures is coupled between the first support member and the coupler to form a first stage and to provide for relative rotational movement between the first support member and the coupler about the axis, wherein a second flexure of the plurality of flexures is coupled between the second support member and the coupler to form a second stage and provide for relative rotational movement between the second support member and the coupler about the axis, wherein the first stage further comprises a third flexure of the plurality of flexures coupled between the first support member and the coupler, and the second stage further comprises a fourth flexure of the plurality of flexures coupled between the second support member and the coupler, wherein the third flexure is disposed between the second flexure and the fourth flexure along the axis to intermingle components of the first stage and the second stage and increase off-axis bending stiffness of the flexural pivot, and wherein relative rotational movement between the first support member and the second support member about the axis is a sum of the relative rotational movements of the first stage and the second stage.

* * * * *